United States Patent [19]
Patterson et al.

[11] Patent Number: 5,872,680
[45] Date of Patent: Feb. 16, 1999

[54] DISK DRIVE SEAL ATTACHED TO A MOTOR RING FLANGE

[75] Inventors: Robert S. Patterson; Edward L. Rich, both of Ogden, Utah

[73] Assignee: Iomega Corporation, Roy, Utah

[21] Appl. No.: 703,227

[22] Filed: Sep. 6, 1996

Related U.S. Application Data

[60] Provisional application No. 60/003,758 Sep. 14, 1995.

[51] Int. Cl.⁶ .................................................. G11B 33/00
[52] U.S. Cl. .................................. 360/97.02; 360/97.01; 360/99.09
[58] Field of Search ............................. 360/97.02, 97.01, 360/99.09, 99.12, 133; 369/75.1, 75.2; 277/592, 594, 596, 650, 652, 936, 944, DIG. 910

[56] References Cited

U.S. PATENT DOCUMENTS

| | | | |
|---|---|---|---|
| 1,095,810 | 5/1914 | Carlitz | 277/652 |
| 2,686,747 | 8/1954 | Wurtz et al. | 277/652 X |
| 2,906,552 | 9/1959 | White | 277/652 |
| 4,434,989 | 3/1984 | Beyer et al. | 277/592 |
| 4,571,718 | 2/1986 | Cahill et al. | 360/133 X |
| 4,785,365 | 11/1988 | Ohkita | 360/97 |
| 5,204,793 | 4/1993 | Plonczak | 360/97.01 |
| 5,241,438 | 8/1993 | Matsushima | 360/105 |
| 5,335,831 | 8/1994 | Foster | 222/325 |
| 5,481,420 | 1/1996 | Cardona et al. | 360/133 X |
| 5,583,710 | 12/1996 | Nicklos et al. | 360/71 |

Primary Examiner—William R. Korzuch
Attorney, Agent, or Firm—Woodcock Washburn Kurtz Mackiewcz & Norris LLP

[57] ABSTRACT

A seal is coupled to a movable member in a disk drive for sealing an opening in a chassis over which the movable member passes. The seal comprises a first layer of foam attached to the movable member, and a second layer of low-friction plastic attached to the layer of foam. The foam layer presses the plastic layer against the chassis to seal the opening as the plastic layer slides over a surface of the chassis.

7 Claims, 10 Drawing Sheets

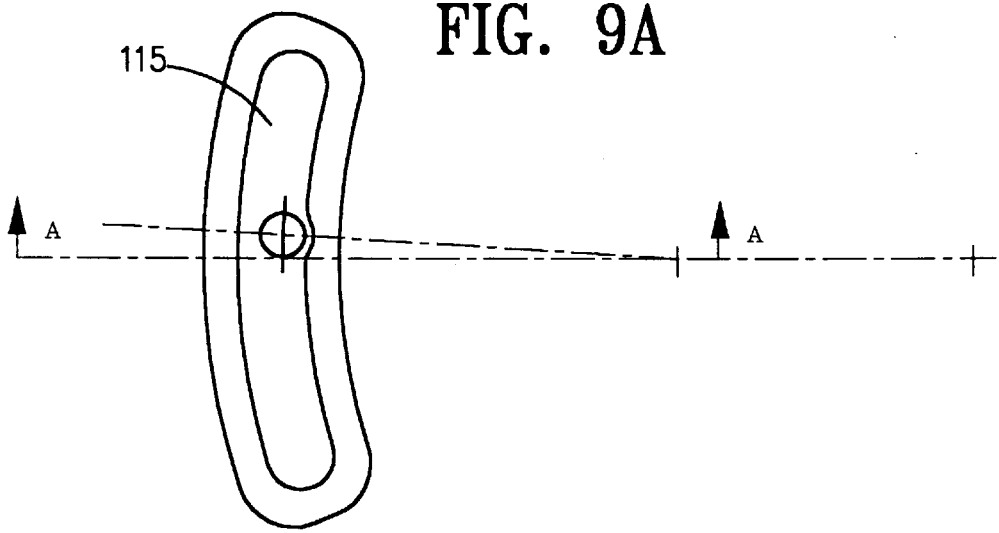
FIG. 9A
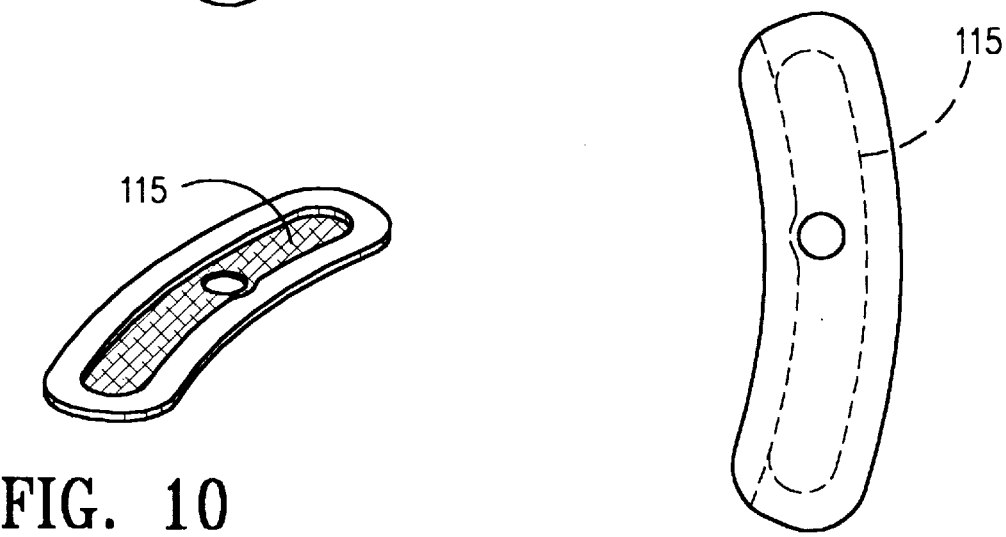
FIG. 10
FIG. 9B
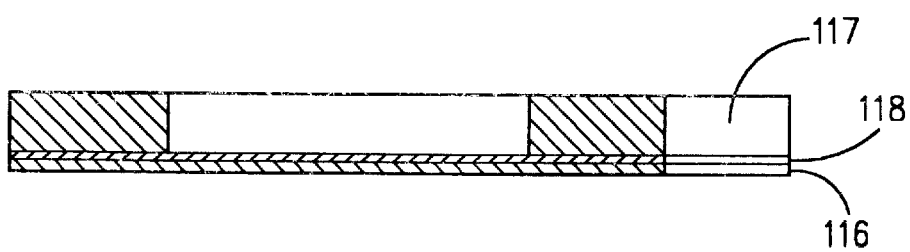
FIG. 11

DISK DRIVE SEAL ATTACHED TO A MOTOR RING FLANGE

BACKGROUND

1. Field of the Invention

The present invention relates to disk drives of the type that accept removable disk cartridges, and more particularly, to a disk drive having a seal that blocks airflow between the inside and outside of a disk drive.

2. Related Applications

This application is based on prior provisional application Ser. No. 60/003,758, filed Sep. 14, 1995, from which priority of this application is claimed. This application is related to U.S. Pat. No. 5,583,710, issued Dec. 10, 1997, in the names of Nicklos et al., entitled "Disk Drive Having An Automatic Spindle Motor Loading Mechanism," which is incorporated herein by reference, in its entirety.

3. Description of the Prior Art

Removable disk cartridges for storing digital electronic information typically comprise an outer casing or shell that houses a rotatable recording medium, or disk, upon which electronic information can be stored. The cartridge shell often comprises upper and lower halves that are joined together to house the disk. The disk is mounted on a hub that rotates freely within the cartridge. When the cartridge is inserted into a disk drive, a motor-driven spindle in the drive must engage the hub in order to rotate the disk(s) within the cartridge.

U.S. Pat. No. 5,204,793, Apr. 20, 1993, Garold Plonczak, "Removable Cartridge Disk Drive With an Integral Head Loading Ramp, Air Filter and Removable Cartridge Door Safety Stop" relates to a removable cartridge disk drive with an integral head loading ramp, air filter and removable cartridge door safety stop. Air filters for reducing contamination in disk drives are known.

The disk drive shown and described in the related application has an opening in the drive which cannot be blocked with air filters of this type. It is an object of the present invention to block airflow into a disk drive. By blocking airflow, the particles that occupy a volume of air are not permitted to enter the internal part of the disk drive. These particles would otherwise damage the head disk interface.

SUMMARY OF THE INVENTION

This invention reduces particles inside a disk drive. According to one aspect of the present invention, this is accomplished by sealing an opening that provides an access to a rotating flange on the outside of the drive to link it to a rotating lever on the inside of the drive. The seal is attached to the rotating flange on the outside of the drive. It is comprised of a layer of low friction plastic attached to a foam layer that matches the perimeter of the rotating mechanism. The attachment layer is a pressure sensitive adhesive, and this same layer is used to attach the seal to the rotating flange. The layer of foam provides a compliant, compressible spring layer that, when attached to the plastic, provides a force that creates a seal between the rotating flange and the drive.

According to another aspect of the present invention, a second seal is provided to cover an opening through which the pins of a connector extend into the interior of the disk drive. This second seal prevents particles from entering the disk drive through this additional opening.

Other features and advantages of the present invention will become evident hereinafter.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings embodiments that are presently preferred, it being understood, however, that the invention is not limited to the specific methods and instrumentalities disclosed. In the drawings:

FIGS. 9A–B are top and bottom views, respectively, of the seal and the flange;

FIG. 10 is a perspective view of the seal;

FIG. 11 is a cross-sectional view taken along line A—A of FIG. 9A;

DETAILED DESCRIPTION OF THE PREFERRED EMBODIMENT

Figure 1:
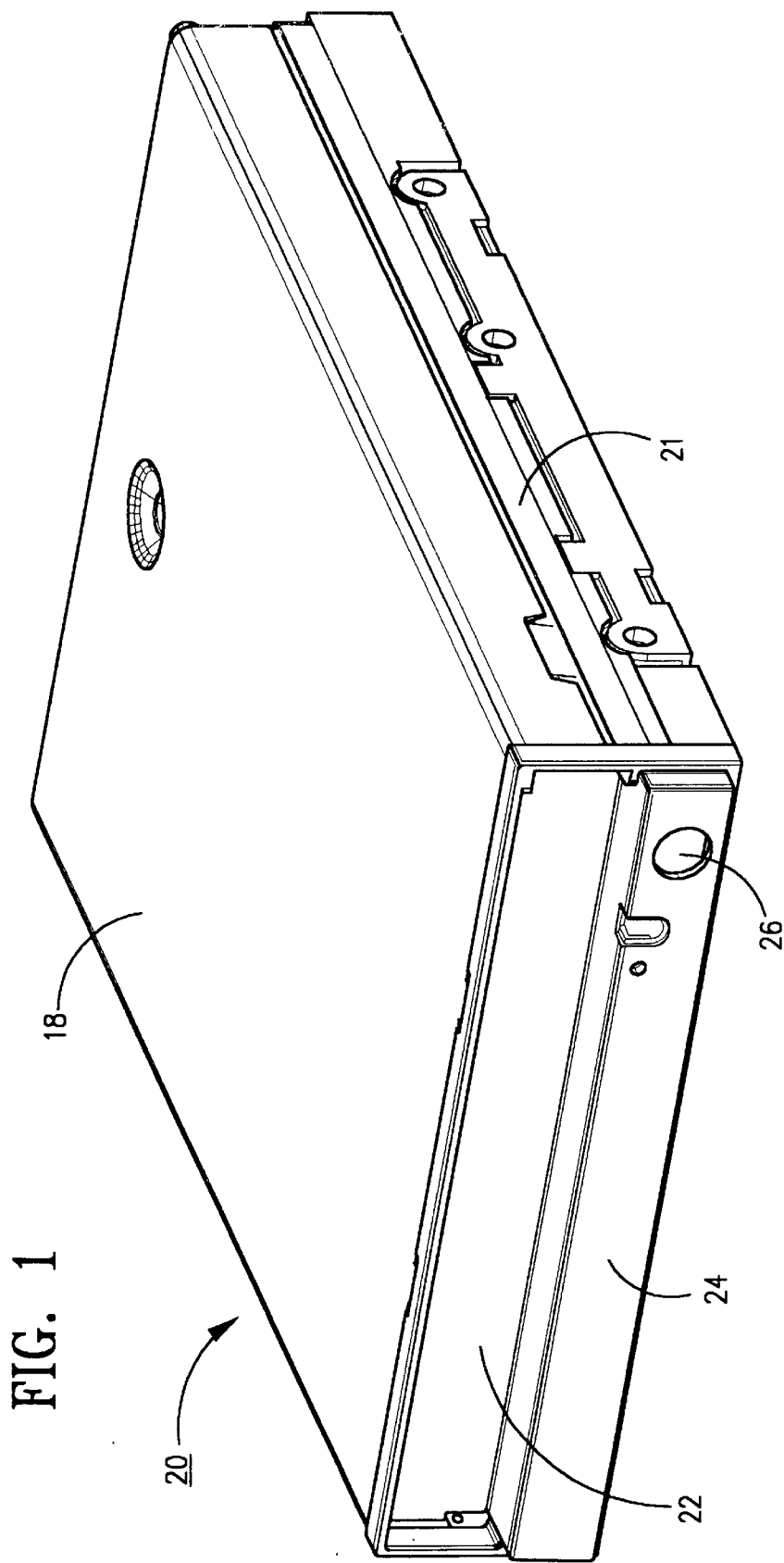
FIG. 1 is a perspective view of a disk drive in accordance with a preferred embodiment of the present invention.

FIG. 1 shows a preferred embodiment of a disk drive 20 for receiving a cartridge, according to the present invention. The disk drive 20 comprises an outer housing 18 that is attached to a rigid chassis 21. A front panel 24 is attached to a forward end of the chassis 21. A disk cartridge (not shown) is inserted into the disk drive 20 through an elongate, horizontal opening 22 in the front panel 24. An eject button 26 is provided on the front panel 24 for automatically ejecting the disk cartridge from the disk drive 20. In the embodiment shown, the disk drive 20 is configured for insertion into the housing of a computer system, such as a personal computer. However, the disk drive 20 can also be employed as a stand-alone unit. Preferably, the front panel 24 is formed of plastic, and the housing 18 and drive chassis 21 are formed of metal, although other suitable materials may be employed.

Figure 2:
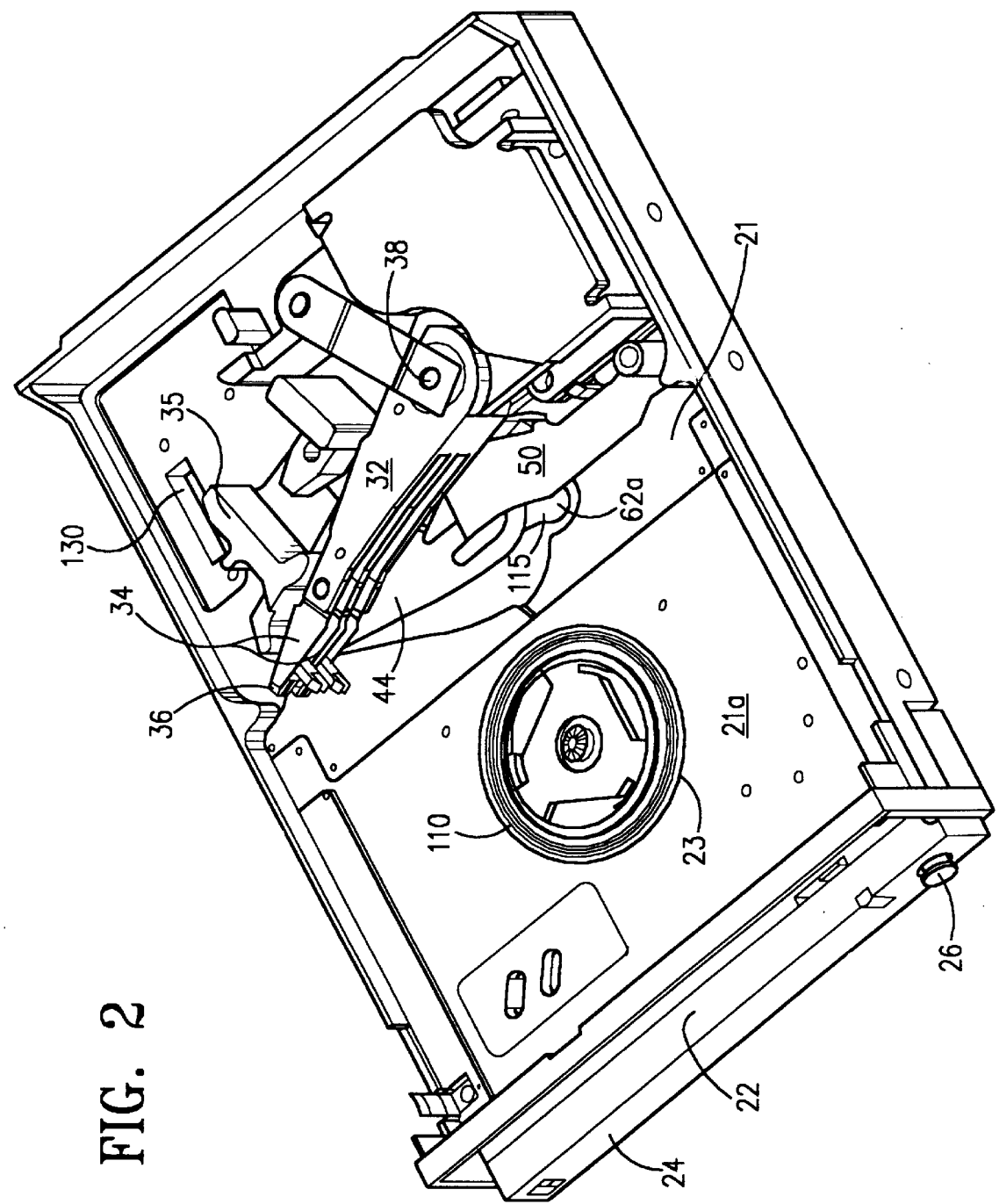
FIG. 2 is a perspective view of the disk drive of FIG. 1 with its outer housing removed to expose the drive chassis and various components mounted thereon.

FIG. 2 is a perspective view of the disk drive 20 of FIG. 1 with the housing 18 removed. As shown, a number of components are mounted on the upper surface 21a of the drive chassis 21. For example, an actuator arm 32, which forms part of a radial arm voice coil actuator, is pivotally mounted to the drive chassis 21 at 38. The actuator arm 32 has a plurality of suspension arms 34 at its distal end that each carry a read/write head 36 for recording and reading information to and from respective surfaces of the recording disks of a disk cartridge (not shown). A voice coil element 42 is affixed to the other end of the actuator arm 32 for controlling the rotational movement of the arm 32. A head loading mechanism 35 facilitates loading of the magnetic heads onto the disk surfaces. Additional details of the actuator and head loading mechanism are provided in co-pending, commonly assigned, U.S. patent application Ser. No. 08/438,254, entitled "Head Loading Mechanism for a Disk 25 Drive" and in co-pending, commonly assigned, U.S. patent application Ser. No. 08/377,033, filed Jan. 23, 1995, entitled "Compliant Anchor for Securing Disk Drive Actuator Bearing", both of which are incorporated herein by reference, in their entireties.

Another opening 130 is provided in the disk drive chassis 21, though which the pins of an electrical connector (not shown) extend to provide electrical connection between components on the upper surface 21*a* of the chassis and circuitry (not shown) on a bottom surface of the chassis. Further details concerning this aspect of the disk drive are provided hereinafter with reference to FIGS. 12–14.

As further shown in FIG. 2, a head park lever 44 and a cartridge eject lever 50 are each pivotally mounted to the drive chassis. The operation of these levers 44, 50 is described hereinafter. As also described hereinafter, a spindle motor 110 and its housing 112 are mounted in a motor ring (not shown) on the underside of the drive chassis 21. The motor ring operates to translate the spindle motor vertically through an opening 23 in the drive chassis 21 in order to engage the hub (not shown) of a disk cartridge (not shown) that has been inserted into the disk drive.

Figure 3:
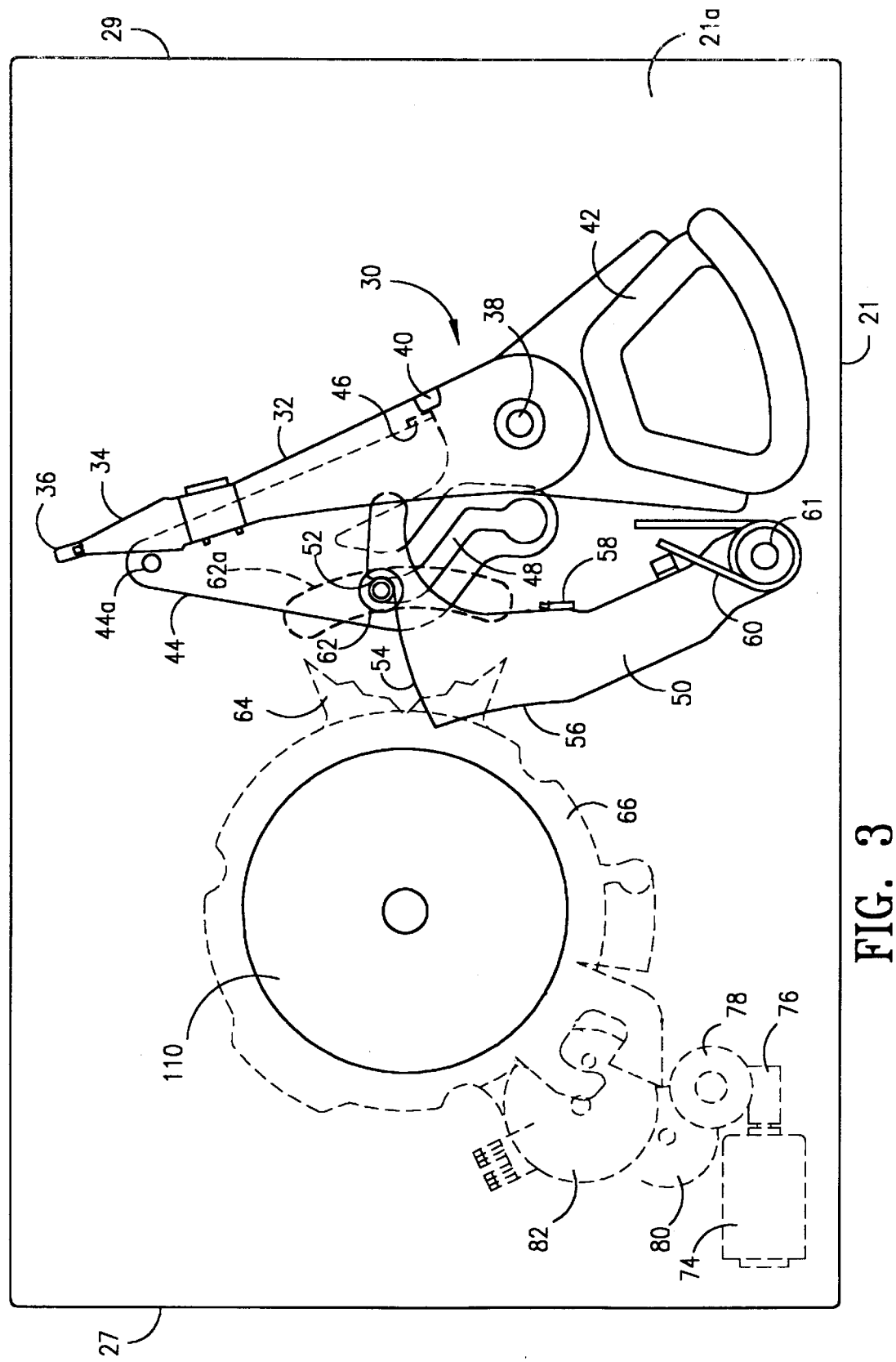
FIGS. 3 and 4 are top and bottom views, respectively, of the drive chassis of FIG. 2 showing the spindle motor loading mechanism in a fully unloaded state.
Figure 4:
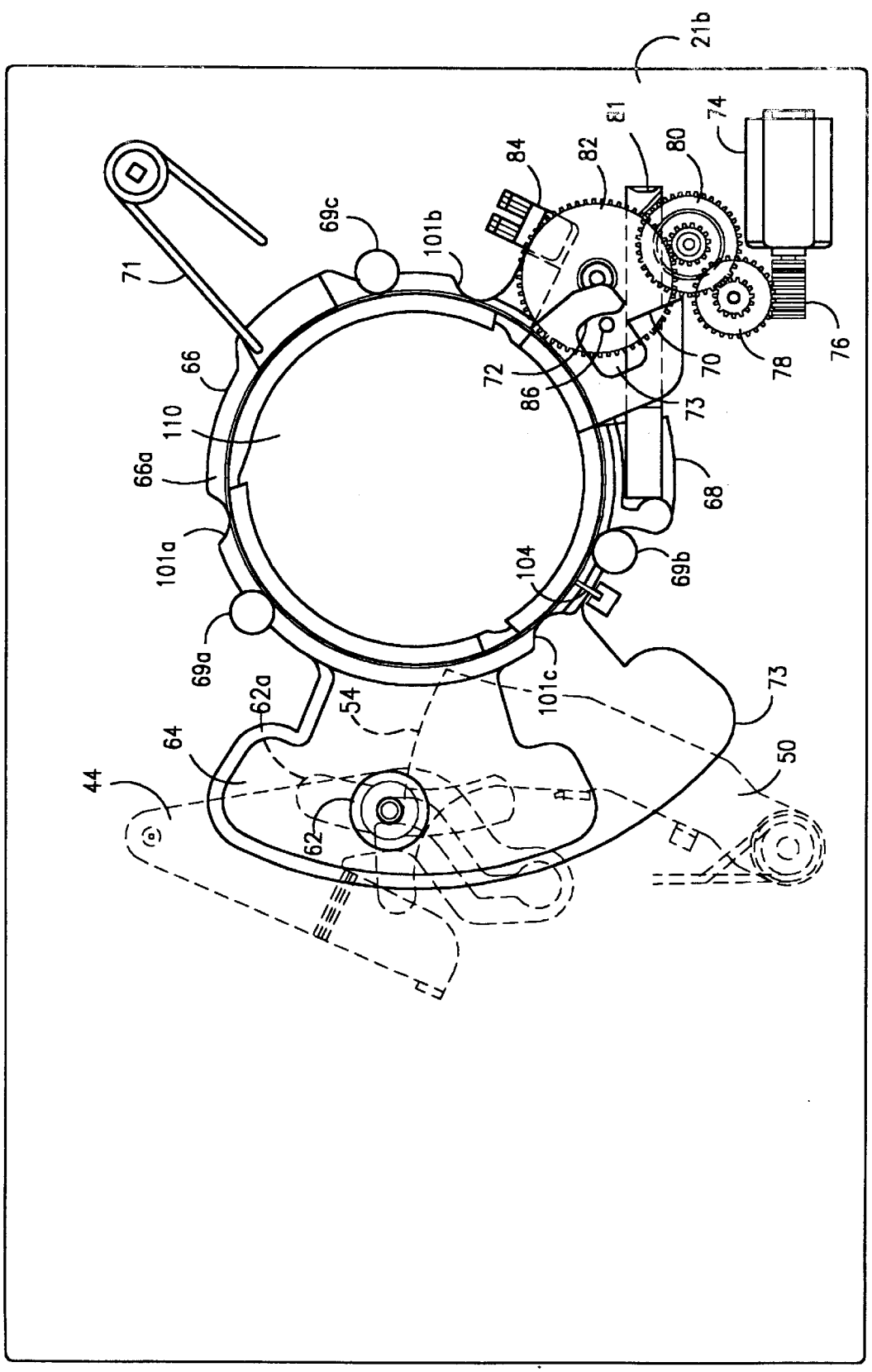

FIGS. 3 and 4 show top and bottom views, respectively, of the disk drive of FIG. 2 and illustrate, in particular, a spindle motor loading mechanism. The spindle motor loading mechanism comprises, generally, a spindle motor 110 and corresponding housing 112, a motor ring 66, a motor ring position transducer (not shown), a motor ring spring 71, a load/eject motor 74 and associated gear train 76–82, and the head park and cartridge eject levers 44, 50 mentioned above. The spindle motor loading and unloading mechanism functions to (1) move the spindle motor into engagement with the hub of a disk cartridge upon insertion of the disk cartridge into the disk drive, (2) unlock the actuator arm of the radial arm voice coil actuator once the spindle motor is engaged, (3) disengage the spindle motor from the cartridge and eject the cartridge from the disk drive when the eject button on the front panel 24 of the disk drive is depressed and (4) move the actuator arm into a retracted, parked position as the cartridge is ejected from the disk drive.

FIGS. 3 and 4 illustrate the position of the head park lever 44, cartridge eject lever 50 and radial arm voice coil actuator 30 when the drive is not in use, i.e., no cartridge has been inserted in the drive. As shown, the cartridge eject lever 50 is pivotally mounted to the upper surface 21*a* of the drive chassis 21. A spring 60 biases the eject lever 50 toward the insertion end 27 (i.e., front) of the drive chassis 21. A catch 52 formed at the distal end of the eject lever 50 engages a pin 62 that is attached to a portion of the motor ring 66 on the underside 21*b* of the drive chassis. When the motor ring 66 is in the position shown in FIG. 3, the pin 62 prevents the eject lever 50 from springing further toward the insertion end 27 of the drive chassis 21.

The eject lever 50 has a dwell cam surface 54 and a second cam surface 56 that, as described hereinafter, slide over the pin 62 of the motor ring 66 during various stages of rotation of the motor ring 66. In the position shown in FIG. 3, the dwell cam surface 54 contacts the pin 62 and thereby prevents the motor ring 66 from rotating toward the pivoted end 61 of the eject lever 50, i.e., clockwise in FIG. 3(counter-clockwise when viewed in FIG. 4).

A cartridge push tab 58 on the eject lever 50 engages the forward end face of a disk cartridge when the cartridge is inserted into the disk drive through the insertion opening 22 in the front panel 24 of the drive. Continued insertion of the disk cartridge causes the eject lever 50 to pivot toward the rear end 29 of the disk drive against the force of spring 60. This loads the spring 60. As the eject lever 50 pivots toward the rear end 29 of the disk drive, the dwell cam surface 54 will slide along the pin 62 until it moves just past the pin 62, thereby releasing the pin 62 and allowing the motor ring 66 to rotate.

The head park lever 44 is pivotally mounted to the upper surface 21*a* of the drive chassis 21 at 44*a*. Movement of the head park lever 44 is controlled by movement of the motor ring pin 62 along a contoured groove 48 in the head park lever 44. As the motor ring 66, and hence pin 62, rotate clockwise in FIG. 3 (counter-clockwise when viewed from below in FIG. 4), the pin 62 will engage the contoured surfaces of groove 48 causing the head park lever to swing toward the insertion end 27 of the disk drive. Movement of the motor ring 66 in the opposite direction will cause the head park lever 44 to move back to the position illustrated in FIG. 3.

The head park lever 44 has a push back tab 46 positioned to engage a mating projection 40 formed on the actuator arm 32. In the position shown in FIG. 3, the push back tab 46 of the head park lever 44 prevents the actuator arm 32 from rotating toward the insertion end 27 of the disk drive, i.e., the actuator arm 32 is in a "parked" position. Movement of the head park lever 44 toward the insertion end 27 of the disk drive will, of course, move the push back tab 46 away from the actuator arm 32, allowing the actuator arm 32 to move toward the insertion end 27 of the drive in order to load the read/write heads 36 at the end of the actuator arm 32 onto the recording disks of the cartridge (not shown).

FIG. 4 shows the underside 21*b* of the drive chassis 21 and provides additional details of the spindle motor loading mechanism, including the motor ring 66, load/eject motor 74 and gear train 76–82. The motor ring 66 is rotatably mounted on the underside 21*b* of the drive chassis 21 via three flat-headed pins 69*a–c* that capture a retaining shoulder 66*a* that extends around the base of the motor ring 66. Access pockets 101*a–c* are formed in the retaining shoulder 66*a* to facilitate assembly of the motor ring 66 to the drive chassis 21. The motor ring 66 is mounted by aligning the access pockets 101*a–c* with the flat-headed pins 69*a–c*, pressing the motor ring 66 against the underside 21*b* of the drive chassis 21, and then rotating the motor ring 66 into position so that the flat-headed pins 69*a–c* capture respective portions of the retaining shoulder 66*a*.

The motor ring 66 has an enlarged seal flange 64 that rides in a recessed portion 73 of the drive chassis 21 as the motor ring 66 rotates back and forth. In the present embodiment, the motor ring 66 rotates back and forth through a 20.6 degree arc. The aforementioned pin 62 of the motor ring 66 is affixed (e.g., riveted) to the enlarged flange 64, and, as mentioned above, extends through an elongate opening 62*a* in the drive chassis to engage the groove 48 of the head park lever 44 and the dwell cam and second cam surfaces 54, 56 of the eject lever 50 on the opposite side of the chassis 21. The elongate opening 62*a* in the chassis must be sufficiently long and wide to allow the pin 62 to move through the entire 20.6 degree arc of the motor ring 66. The seal flange 64 blocks off the opening 62a in the drive chassis 21 over the full travel of the motor ring 66 to reduce contamination flow in the drive.

Figure 5:
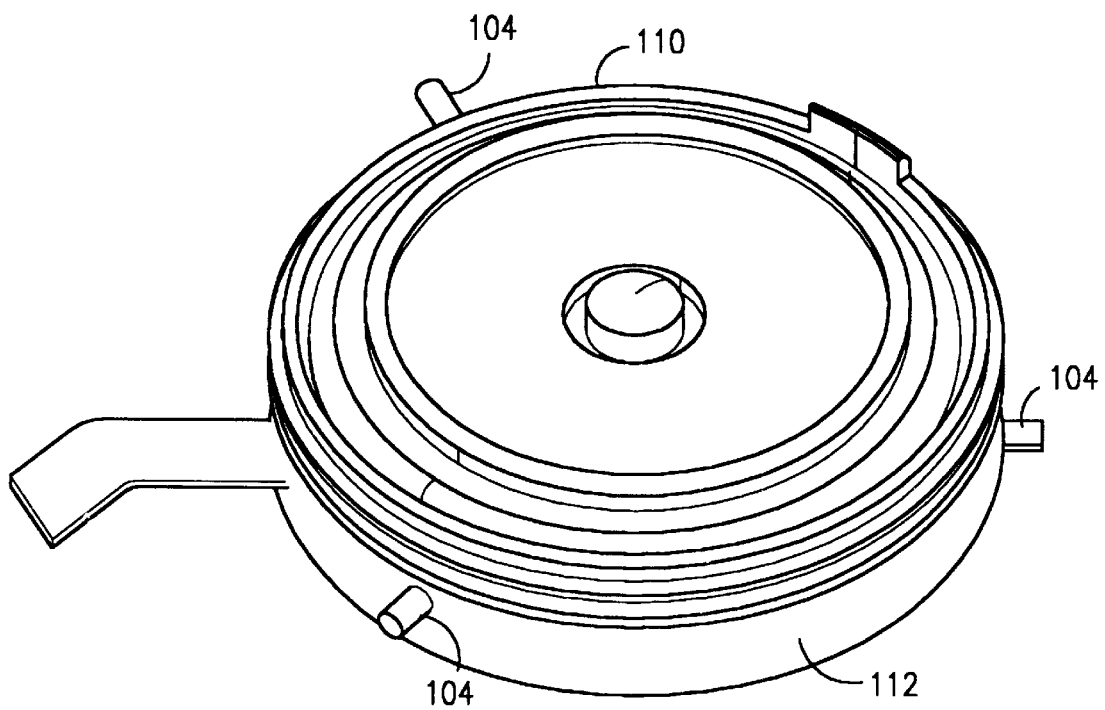
FIG. 5 is an enlarged perspective view of the spindle motor and spindle motor housing of the disk drive of the present invention.
Figure 6B:
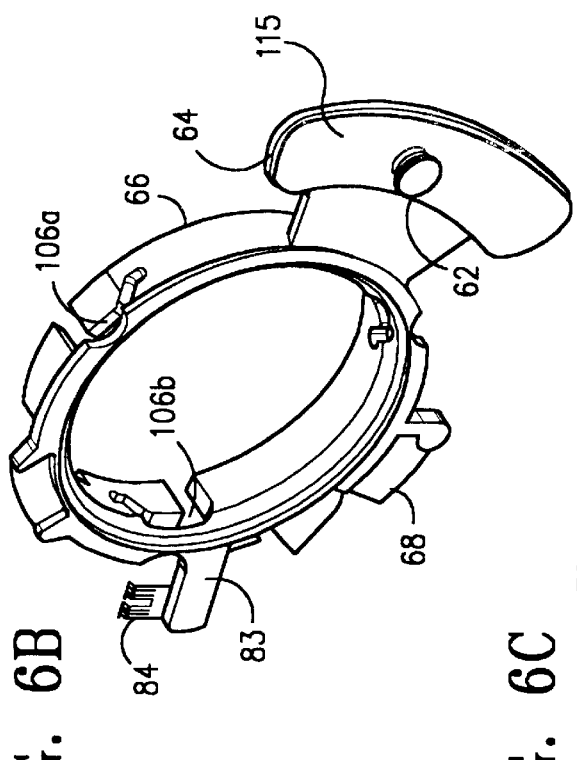
FIGS. 6A–6D show various additional views of the motor ring of FIGS. 3 and 4.
Figure 6C:
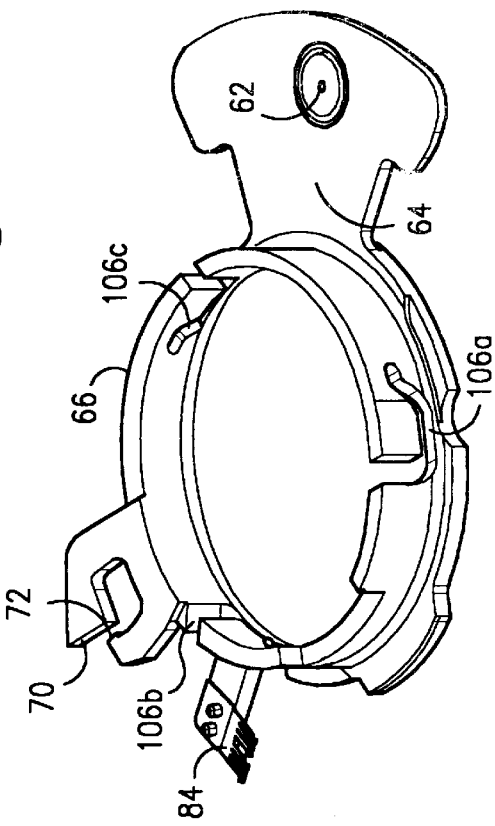
Figure 6A:
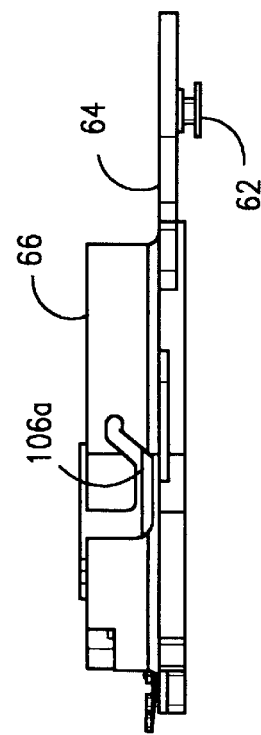
Figure 6D:
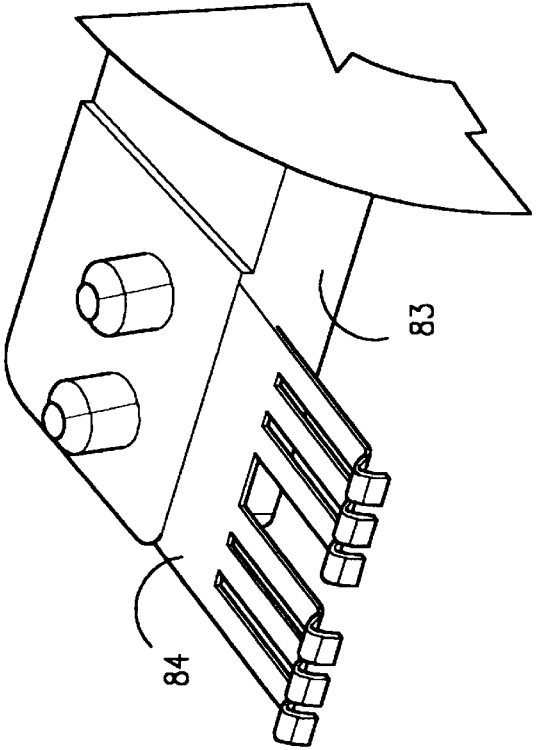
Figure 7:
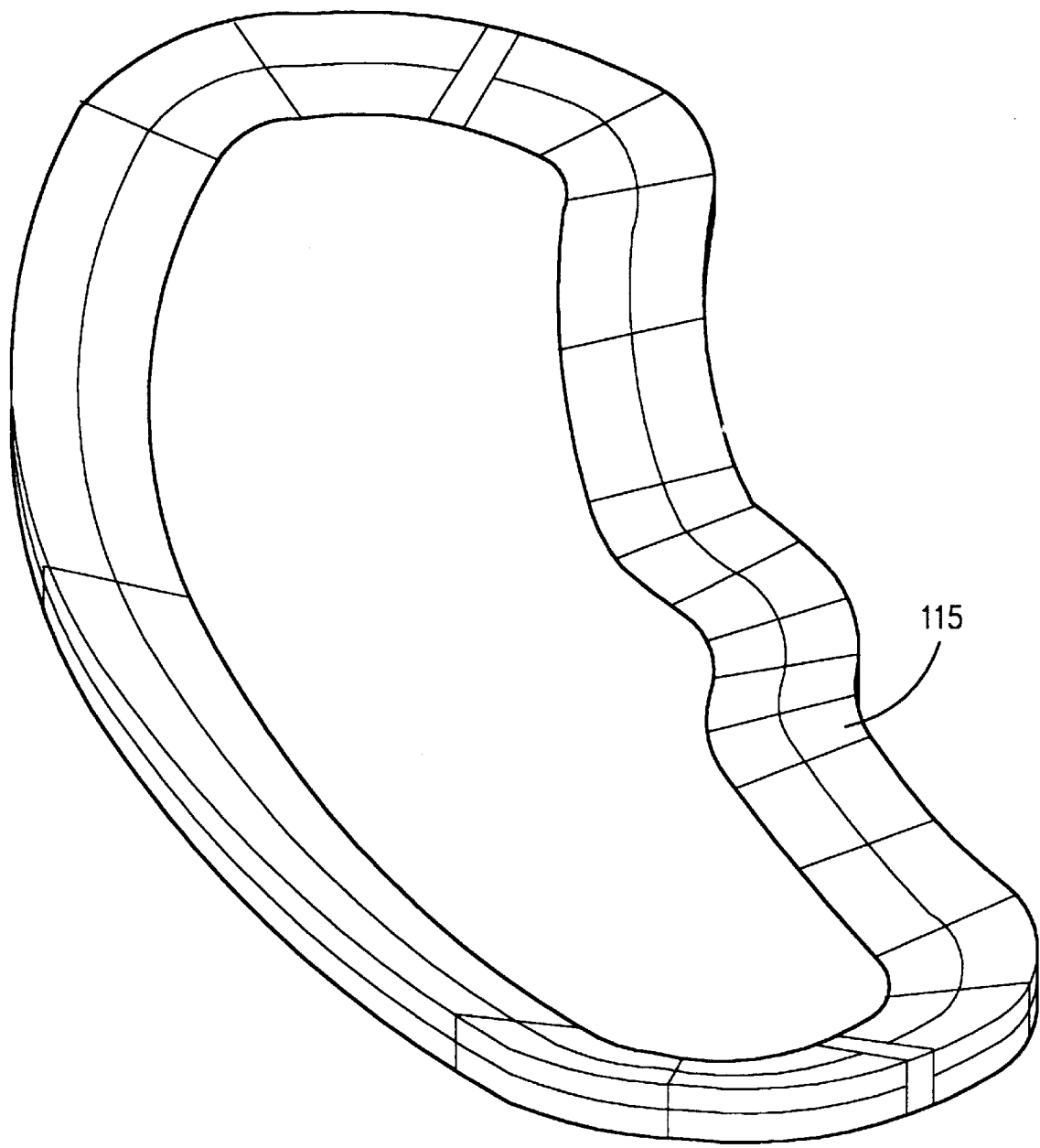
FIG. 7 is an enlarged view of the seal of the present invention.
Figure 8:
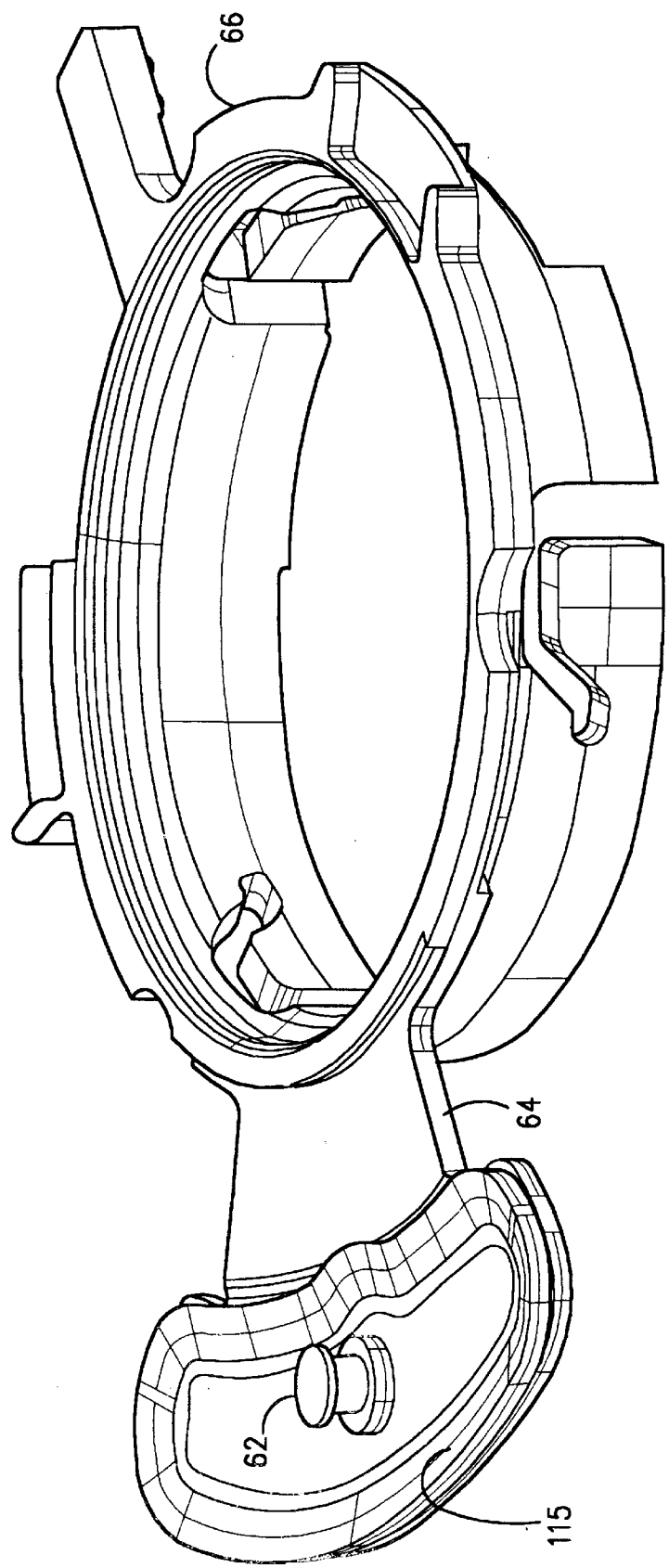
FIG. 8 shows the seal in place on the flange.

FIG. 5 is a perspective view of the spindle motor 110 and its associated housing 112. The housing 112 of the spindle motor has a plurality of pins extending substantially radially therefrom. In the present embodiment, the housing 112 has three pins spaced equally about the circumference of the housing 112.

FIGS. 6A–6D show further views of the motor ring 66 and provide additional details thereof. As shown, the motor ring 66 further includes a plurality of cam slots 106a–c that receive the corresponding pins 104 of the spindle motor housing 112 when the spindle motor is mounted in the motor ring 66.

As described herein, the motor ring 66 and associated pin 62 define a first movable member on the outside of the chassis 21 of the disk drive, and the head park lever 44 defines a second movable member on the inside of the chassis 21. The pin 62 of the motor ring 66 is coupled to the head park lever 44 through the opening 62a in the chassis.

In accordance with the present invention, a seal 115 is mounted on the seal flange 64 of the motor ring 66. The seal 115 blocks contaminating airflow through opening 62a in the chassis. As best shown in FIG. 11, the seal includes a layer of low friction plastic 116 attached to a foam layer 117 by adhesive 118. A pressure sensitive adhesive is used and is also used to attach the seal 115 to the flange 64. The layer of foam 117 provides a compliant, compressible spring layer. In combination with the plastic layer 116, it provides a force that creates a seal between the rotating flange and the chassis 21 of the drive over the full range of motion of the rotating flange 64.

The friction between the seal and the drive is low for several reasons. The low friction plastic interfaces with the chassis 21 of the drive rather than having the foam itself interface with the drive. The foam occupies a small portion of the total surface area of the seal and thus provides low pressure against the drive. The surface of the plastic is lower in elevation where it is joined to the rotating flange, in comparison to the outside edge. As a result, the foam forces the plastic into a concave surface. The result is that the pressure exerted by the foam is highest at the outside edge of the seal. This provides a high force over a very small area with the result being an excellent seal with a relatively low pressure between the rotating mechanism and the drive. The features of this aspect of the invention include a movable seal that has low friction between surfaces, has a thin profile, conforms to a surface which is not flat, exerts minimal pressure, is low-cost and is lightweight.

Figure 12:
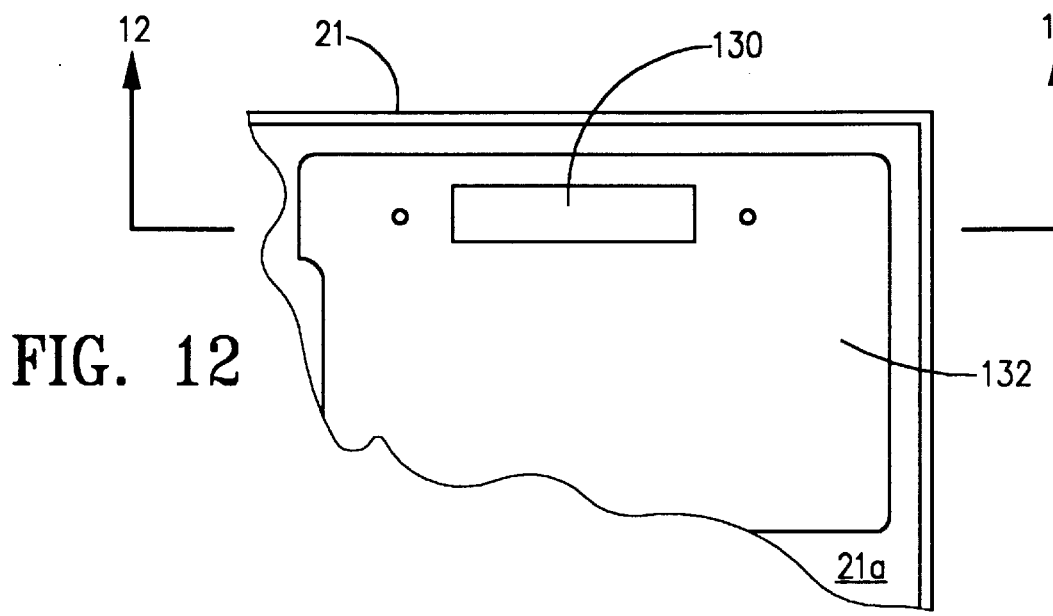
FIG. 12 shows a portion of the upper surface of the chassis of the disk drive, which includes an additional opening.

FIG. 12 is a top view of a portion of the upper surface 21a of the chassis 21 of the disk drive, showing, in particular, the additional opening 130 in the chassis. The opening 130 provides a means through which the pins of an electrical connector (not shown) extend to provide electrical connection between components on the upper surface 21a of the chassis and circuitry (not shown) on a bottom surface of the chassis. The opening 130 is located in a recessed portion 132 of the upper surface 21a of the chassis 21. The recessed portion 132 of the chassis receives a small circuit board when the drive is fully assembled, as described hereinafter.

Figure 13:
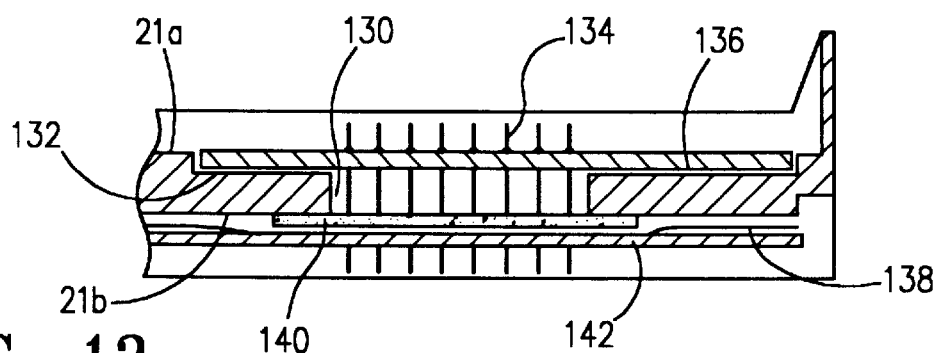
FIG. 13 is a cross-section of the portion of the chassis shown in FIG. 12, taken along line 12—12, and further shows a second seal according to another aspect of the present invention.

FIG. 13 is a sectional view of the portion of the disk drive shown in FIG. 12, taken along line 12—12. FIG. 13 shows various components that were omitted from FIG. 12 for convenience. As shown in FIG. 13, a small circuit 136 occupies the recessed portion 132 of the upper surface 21a of the chassis of the disk drive. Pins (e.g., 134), which form an electrical connector, extend downward from the circuit board 136, through the opening 130 in the chassis. According to another aspect of the present invention, the pins of the connector extend past the bottom surface 21b of the chassis, through a second seal 140, and then through a second circuit board 142 mounted to the bottom surface 21b of the chassis. A thin layer of plastic 138, which has an opening that is coextensive with the opening 130 in the chassis, lies between the bottom surface 21b of the chassis and the second circuit board 142 to prevent undesired contact between the chassis 21 and the second circuit board 142.

Figure 14:
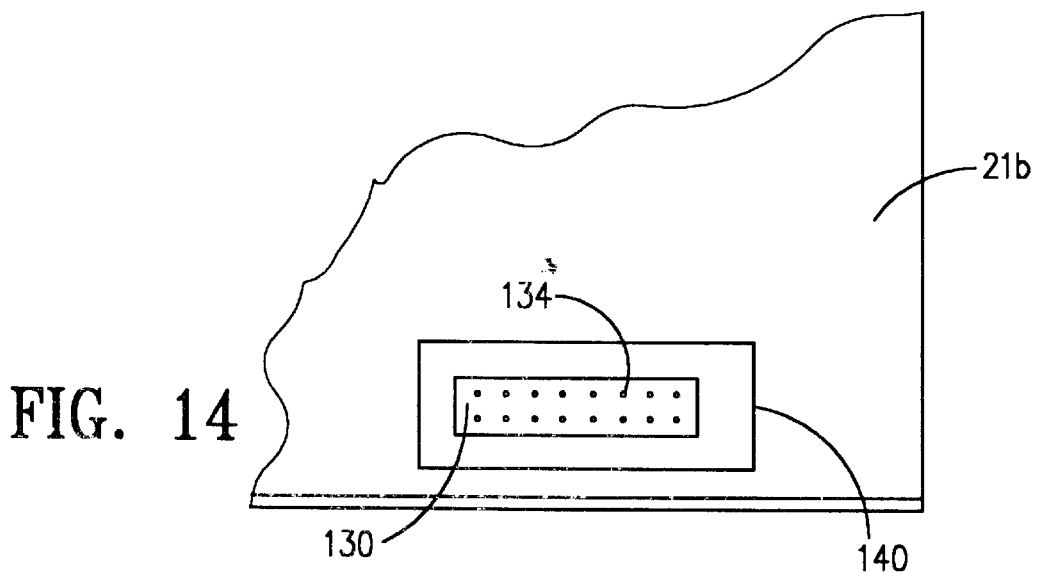
FIG. 14 is a view of the bottom surface of the portion of the chassis shown in FIG. 12.

In the present embodiment, the second seal 140 is made of a thin layer of foam. However, in other embodiments, other suitable materials may be employed, such as, for example, rubber. As best shown in FIG. 14, the second seal 140 lies over the opening 130 on the bottom surface 21b of the chassis to prevent particles from passing through the opening 130 to the other side 21a of the chassis (which defines the interior of the drive when the drive is fully assembled). The pins (e.g., 134) of the connector pass through the foam layer 140, which conforms to the pins to maintain the seal.

It is understood that changes may be made to the embodiments described above without departing from the broad inventive concepts thereof. Accordingly, the present invention is not limited to the particular embodiments disclosed, but is intended to cover all modifications that are within the spirit and scope of the invention as defined by the appended claims.

What is claimed is:

1. A data storage device comprising:

a transducer for recording and/or reproducing information to/from a storage medium, and a spindle motor for rotating the storage medium, the spindle motor being translated by a motor ring having a first movable member;

a chassis having an opening that provides access by the first movable member which is located on an outside of the chassis to a second movable member on an inside of the chassis, the first and second members being coupled through said opening by a pin; and a seal attached to the first movable member that covers the opening throughout a range of motion of the first movable member to prevent contaminates from passing through said opening from the outside of the chassis to the inside of the chassis, said seal comprising:

a first layer of foam attached to the first movable member; and a second layer of low-friction plastic attached to the layer of foam, the second layer of plastic having a hole for the pin, and the foam layer pressing the plastic layer against the chassis to seal the opening as the plastic layer slides over a surface of the chassis, wherein the first layer of foam extends around an outer edge of the second layer of plastic such that the pressure exerted by the seal against the chassis is substantially concentrated at the outer edge of the second layer of plastic, thereby minimizing the surface area over which the seal presses against the chassis.

2. The data storage device of claim 1 wherein the first movable member includes a substantially planar flange having a surface area that covers the opening throughout the range of motion of the first movable member, said seal being affixed to said flange.

3. The data storage device of claim 2 wherein the plastic layer of the seal is substantially coextensive with the surface area of the flange.

4. The data storage device of claim 1 wherein the layer of plastic is attached to the layer of foam using a pressure sensitive adhesive.

5. The data storage device of claim 1 wherein the seal is attached to the first movable member using a pressure sensitive adhesive.

6. The data storage device of claim 1 wherein the chassis has a second opening through which the pins of an electrical connector extend to provide electrical connection between components on opposite sides of the chassis, and wherein a second seal is provided over the second opening to prevent particles from passing therethrough, the pins of the electrical connector passing through the second seal.

7. The data storage device of claim 6 wherein the second seal comprises a layer of foam.

\* \* \* \* \*